(12) United States Patent  (10) Patent No.: US 10,766,796 B2
Simmons  (45) Date of Patent: Sep. 8, 2020

(54) CHEMICAL INJECTION AND CONTROL SYSTEM AND METHOD FOR CONTROLLING CHLORAMINES

(71) Applicant: UGSI Solutions, Inc., Poway, CA (US)

(72) Inventor: Brent A. Simmons, Palo Alto, CA (US)

(73) Assignee: UGSI Solutions, Inc., Poway, CA (US)

( * ) Notice: Subject to any disclaimer, the term of this patent is extended or adjusted under 35 U.S.C. 154(b) by 371 days.

(21) Appl. No.: 15/177,967

(22) Filed: Jun. 9, 2016

(65) Prior Publication Data

US 2016/0362318 A1  Dec. 15, 2016

Related U.S. Application Data

(60) Provisional application No. 62/174,803, filed on Jun. 12, 2015.

(51) Int. Cl.
*C02F 1/68* (2006.01)
*C02F 1/76* (2006.01)

(52) U.S. Cl.
CPC ............... *C02F 1/685* (2013.01); *C02F 1/76* (2013.01); *C02F 2209/006* (2013.01);
(Continued)

(58) Field of Classification Search
None
See application file for complete search history.

(56) References Cited

U.S. PATENT DOCUMENTS 4,406,582 A  9/1983 LaGrange
4,435,291 A  3/1984 Matsko
(Continued)

FOREIGN PATENT DOCUMENTS

WO  0238507 A1  5/2002
WO  2009055093 A1  4/2009
(Continued)

OTHER PUBLICATIONS

White's Handbook of Chlorination and Alternative Disinfectants Chemistry of Aqueous Chlorine, Black & Veatch, 2010, pp. 102-117, 5th Edition.
(Continued)

*Primary Examiner* — Richard C Gurtowski
(74) *Attorney, Agent, or Firm* — The Webb Law Firm

(57) ABSTRACT

A method of automatically controlling chloramine concentration in a body of water contained in a reservoir includes: (a) determining residual chloramine concentration in a first water sample obtained from the body of water; (b) automatically engaging a supply of chlorine to add chlorine to the body of water when the residual chloramine concentration in the first water sample is determined to be below a residual chloramine concentration set-point or a first chloramine concentration percentage; (c) determining residual chloramine concentration in a second water sample obtained from the body of water after step (b); and (d) automatically engaging a supply of ammonia and the supply of chlorine to add both ammonia and chlorine to the body of water if the residual chloramine concentration in the second water sample is determined to be below the residual chloramine concentration in the first water sample or a second chloramine concentration percentage.

14 Claims, 7 Drawing Sheets

(52) U.S. Cl.
CPC ...... *C02F 2209/29* (2013.01); *C02F 2303/04* (2013.01); *C02F 2305/00* (2013.01)

(56) References Cited

U.S. PATENT DOCUMENTS

| | | | |
|---|---|---|---|
| 4,752,740 | A | 6/1988 | Steininger |
| 5,547,584 | A | 8/1996 | Capehart |
| 5,854,744 | A | 12/1998 | Zeng et al. |
| 5,934,877 | A | 8/1999 | Harman |
| 6,143,184 | A | 11/2000 | Martin et al. |
| 6,315,950 | B1 | 11/2001 | Harp et al. |
| 6,702,551 | B2 | 3/2004 | Kikuchi et al. |
| 6,716,354 | B2 | 4/2004 | Rosenblatt et al. |
| 7,300,592 | B2 | 11/2007 | Iseki et al. |
| 7,488,151 | B2 | 2/2009 | Harman |
| 7,862,302 | B2 | 1/2011 | Harman |
| 8,051,383 | B2 | 11/2011 | McCampbell et al. |
| 8,887,556 | B2 | 11/2014 | Silveri |
| 9,039,902 | B2 | 5/2015 | Simmons et al. |
| 2003/0232447 | A1 | 12/2003 | Kahle |
| 2005/0137118 | A1 | 6/2005 | Silveri |
| 2006/0096930 | A1 | 5/2006 | Beardwood |
| 2006/0124558 | A1* | 6/2006 | Kouame ............. C02F 1/50 210/764 |
| 2009/0320570 | A1 | 12/2009 | Wiese |
| 2011/0210078 | A1* | 9/2011 | Simmons ............. C02F 1/4672 210/739 |
| 2012/0021062 | A1 | 1/2012 | Gupta et al. |
| 2015/0203388 | A1 | 7/2015 | Gotthardt et al. |
| 2015/0329391 | A1 | 11/2015 | Garusi et al. |
| 2016/0362318 | A1 | 12/2016 | Simmons |
| 2016/0376166 | A1 | 12/2016 | Lawryshyn et al. |
| 2017/0190601 | A1 | 7/2017 | Augustine et al. |
| 2017/0203974 | A1 | 7/2017 | Riedl et al. |
| 2017/0253502 | A1 | 9/2017 | Bejan et al. |
| 2018/0282882 | A1 | 10/2018 | Boal et al. |

FOREIGN PATENT DOCUMENTS

| | | |
|---|---|---|
| WO | 2012010864 A1 | 1/2012 |
| WO | 2013009106 A2 | 1/2013 |
| WO | 2015179919 A1 | 12/2015 |
| WO | 2015187982 A1 | 12/2015 |

OTHER PUBLICATIONS

Baribeau, Helene, Ph.D., P.E., Nitrification in Distribution Systems: Effects, Causes, and Control, AWWA 2015 Operator Symposium, Mar. 18, 2015, AQUAlity Engineering, Inc., Ontario, California.

Steininger, "PPM or ORP: Which Should Be Used?", Swimming Pool Age & Spa Merchandiser, Nov. 1985.

Turner, "Slope Filtering: An FIR Approach to Linear Regression", IEEE Signal Processing Magazine, Nov. 2008, pp. 159-163.

Yu et al., "Determination of chlorine demand in water and wastewater chlorination by oxidation-reduction potential", Water Science and Technology: Water Supply, 2003, pp. 313-320, vol. 3, No. 1-2.

"Oxidation Reduction Potential (ORP)/Redox and Free Chlorine", Myron L Company, 2012.

Demir, et al., Feedback control over the chlorine disinfection process at a wastewater treatment plant using a Smith predictor, a method of characteristics and odometric transformation, J Env Chem Engg, 2 (2014) 1088-1097 (Year: 2014).

\* cited by examiner

CHEMICAL INJECTION AND CONTROL SYSTEM AND METHOD FOR CONTROLLING CHLORAMINES

CROSS REFERENCE TO RELATED APPLICATIONS

This application claims the benefit of U.S. Provisional Patent Application No. 62/174,803, filed Jun. 12, 2015, which is incorporated herein by reference in its entirety.

BACKGROUND OF THE INVENTION

Field of the Invention

The present invention relates to chemical injection and control systems for controlling chloramines and methods of operating such systems.

Description of Related Art

Water utilities typically add disinfectants to water systems to prevent contamination from germs and bacteria such as *Salmonella*. While chlorine is the most commonly used secondary disinfectant, many water utilities are turning to chloramines as an alternative. As compared to chlorine, chloramines have a longer residual life and are less prone to disinfection byproduct formation. Despite these advantages, chloramine usage can be problematic. For instance, a water system is typically dosed with hypochlorite and ammonia to produce monochloramine; however, if the chlorine-to-ammonia ratio is not accurately controlled, undesirable side-effects occur such as nitrification, over-chlorination, and low oxidation levels. Thus, it is desirable to provide a chemical injection system that can be accurately controlled to continuously produce stable forms of monochloramine in a water system at a desired concentration.

SUMMARY OF THE INVENTION

Generally, provided is an improved chloramine injection and control system and method.

In one preferred and non-limiting embodiment or aspect, provided is a method of automatically controlling chloramine concentration in a body of water contained in a reservoir. The method includes: (a) determining residual chloramine concentration in a first water sample obtained from the body of water; (b) automatically engaging a supply of chlorine to add chlorine to the body of water when (i) the residual chloramine concentration in the first water sample is determined to be below a pre-determined residual chloramine concentration set-point or (ii) the residual chloramine concentration in the first water sample is determined to be below a first chloramine concentration percentage of a pre-determined residual chloramine concentration set-point; (c) determining residual chloramine concentration in a second water sample obtained from the body of water after step (b); and (d) automatically engaging a supply of ammonia and the supply of chlorine to add both ammonia and chlorine to the body of water if (i) the residual chloramine concentration in the second water sample is determined to be below the residual chloramine concentration in the first water sample or (ii) the residual chloramine concentration in the second water sample is determined to be below a second chloramine concentration percentage of the pre-determined residual chloramine concentration set-point.

In some preferred and non-limiting embodiments or aspects, the supply of chlorine is added to the body of water in step (b) when (i) the residual chloramine concentration in the first water sample is determined to be below the pre-determined residual chloramine concentration set-point, and the supply of chlorine and the supply of ammonia are both added to the body of water in step (d) when (i) the residual chloramine concentration in the second water sample is determined to be below the residual chloramine concentration in the first water sample.

In another preferred and non-limiting embodiment or aspect, the supply of chlorine is added to the body of water in step (b) when (i) the residual chloramine concentration in the first water sample is determined to be below the pre-determined residual chloramine concentration set-point, and the supply of chlorine and the supply of ammonia are both added to the body of water in step (d) when (ii) the residual chloramine concentration in the second water sample is determined to be below the second chloramine concentration percentage of the pre-determined residual chloramine concentration set-point.

Further, in one preferred and non-limiting embodiment or aspect, the supply of chlorine is added to the body of water in step (b) when (ii) the residual chloramine concentration in the first water sample is determined to be below the first chloramine concentration percentage of the pre-determined residual chloramine concentration set-point, and the supply of chlorine and the supply of ammonia are both added to the body of water in step (d) when (i) the residual chloramine concentration in the second water sample is determined to be below the residual chloramine concentration in the first water sample.

In yet another preferred and non-limiting embodiment or aspect, the supply of chlorine is added to the body of water in step (b) when (ii) the residual chloramine concentration in the first water sample is determined to be below the first chloramine concentration percentage of the pre-determined residual chloramine concentration set-point, and the supply of chlorine and the supply of ammonia are both added to the body of water in step (d) when (ii) the residual chloramine concentration in the second water sample is determined to be below the second chloramine concentration percentage of the pre-determined residual chloramine concentration set-point.

As indicated, a supply of chlorine or a supply of chlorine and ammonia can be added to the body of water if the residual chloramine concentration is determined to be below the first or second chloramine concentration percentage of the pre-determined residual chloramine concentration set-point, respectively. In certain preferred and non-limiting embodiments or aspects, the first and/or second chloramine concentration percentage is a percentage selected within a range about 99% to about 80% of the pre-determined residual chloramine concentration set-point, provided that the first chloramine concentration percentage is higher than the second chloramine concentration percentage when both the first and second chloramine concentration percentages are utilized to control the chloramine concentration.

Moreover, and as previously described, in one preferred and non-limiting embodiment or aspect, the method will only proceed with step (d) if the residual chloramine concentration in the second water sample is determined to be below the residual chloramine concentration in the first water sample or if the residual chloramine concentration in the second water sample is determined to be below the second chloramine concentration percentage of the pre-determined residual chloramine concentration set-point. If these conditions, are satisfied, the supply of chlorine and the supply of ammonia will be added to the body of water during step (d) until a subsequently obtained water sample is determined to be at or above the pre-determined residual chloramine concentration set-point. If the conditions for proceeding with step (d) are not satisfied, the method will proceed with a different step. For example, if the residual chloramine concentration in the second water sample is determined to be at or above the residual chloramine concentration in the first water sample but below the pre-determined residual chloramine concentration set-point, the addition of chlorine only to the body of water is maintained. Alternatively, if the residual chloramine concentration in the second water sample is determined to be at or above the pre-determined residual chloramine concentration set-point, the supply of chlorine to the body of water is stopped.

In certain preferred and non-limiting embodiments or aspects, if it is determined that the body of water has a residual chloramine concentration at or above the pre-determined residual chloramine concentration set-point after step (b) or step (d), the method can further include: (e) determining residual chloramine concentration in a subsequent water sample obtained from the body of water; and (f) automatically engaging the supply of ammonia and the supply of chlorine to add both ammonia and chlorine to the body of water if (i) the residual chloramine concentration in the subsequent water sample is determined to be below the pre-determined residual chloramine concentration set-point or (ii) the residual chloramine concentration in the subsequent water sample is determined to be below a third chloramine concentration percentage of the pre-determined residual chloramine concentration set-point.

In any of the described steps, and in one preferred and non-limiting embodiment or aspect, the feed rate of at least one of the chlorine and ammonia can be determined by reservoir water volume and dwell time. Further, when both chlorine and ammonia are added to the body of water, the chlorine and ammonia can be automatically added to provide a weight ratio of chlorine to ammonia of 5:1. In addition, in some preferred and non-limiting embodiments or aspects, determining the residual chloramine concentration in the first and second water samples includes measuring a total chlorine concentration in the first and second water samples.

In certain preferred and non-limiting embodiments or aspects, the chlorine and optionally the ammonia are added to the body of water by a chemical dosing assembly that comprises chemical treatment flow tubes and a water motive tube. In such embodiments or aspects, the chlorine and optionally the ammonia are added to the body of water by the chemical treatment flow tubes in an area above the water motive tube to form a high energy mixing zone.

In one preferred and non-limiting embodiment or aspect, provided is a treatment delivery system for automatically controlling chloramine concentration in a body of water contained in a reservoir. The system includes: a chemical dosing assembly at least partially submerged in the body of water; a water sampling assembly configured to extract at least a first and second water sample from the body of water at different points in time; an analyzer in fluid communication with the water sampling assembly and configured to determine residual chloramine concentration in the first and second water samples; a controller in operable communication with the analyzer; and one or more computer-readable storage mediums in operable communication with the controller and containing programming instructions that, when executed, cause the controller to: (a) determine whether the residual chloramine concentration in the first water sample obtained from the body of water is below a pre-determined residual chloramine concentration set-point or below a first chloramine concentration percentage of a pre-determined residual chloramine concentration set-point; (b) engage the chemical dosing assembly to add chlorine to the body of water when (i) the residual chloramine concentration in the first water sample is determined to be below a pre-determined residual chloramine concentration set-point or (ii) the residual chloramine concentration in the first water sample is determined to be below a first chloramine concentration percentage of a pre-determined residual chloramine concentration set-point; (c) determine whether the residual chloramine concentration in the second water sample obtained from the body of water after step b) is below the residual chloramine concentration in the first water sample or below a second chloramine concentration percentage of the pre-determined residual chloramine concentration set-point; and (d) engage a supply of chlorine and a supply of ammonia to add both ammonia and chlorine to the body of water if (i) the residual chloramine concentration in the second water sample is determined to be below the residual chloramine concentration in the first water sample or (ii) the residual chloramine concentration in the second water sample is determined to be below a second chloramine concentration percentage of the pre-determined residual chloramine concentration set-point.

In some preferred and non-limiting embodiments or aspects, the water sampling assembly is a component of the chemical dosing assembly, and the analyzer is a total chlorine analyzer. Further, the chemical dosing assembly can also include a water motive tube positioned below a release point of at least one chemical treatment flow tube. The chemical dosing assembly can further include a second chemical treatment flow tube with the water motive tube positioned below a release point of the second chemical treatment flow tube.

In certain preferred and non-limiting embodiments or aspects, the first and second chemical treatment flow tubes are configured to deliver the chlorine and optionally the ammonia to an area above a release point of the water motive tube to form a high energy mixing zone.

In addition, and in one preferred and non-limiting embodiment or aspect, the system can include a hypochlorite storage tank, an ammonia storage tank, or both a hypochlorite storage tank and an ammonia storage tank. In some preferred and non-limiting embodiments or aspects, the system includes a hypochlorite generation system. The controller can also be programmed to provide a weight ratio of chlorine to ammonia of 5:1.

Additional preferred and non-limiting embodiments or aspects are set forth and described in the following clauses.

Clause 1. A method of automatically controlling chloramine concentration in a body of water contained in a reservoir, the method comprising: a) determining residual chloramine concentration in a first water sample obtained from the body of water; b) automatically engaging a supply of chlorine to add chlorine to the body of water when: i) the residual chloramine concentration in the first water sample is determined to be below a pre-determined residual chloramine concentration set-point; or ii) the residual chloramine concentration in the first water sample is determined to be below a first chloramine concentration percentage of a pre-determined residual chloramine concentration set-point; c) determining residual chloramine concentration in a second water sample obtained from the body of water after step b); and d) automatically engaging a supply of ammonia and the supply of chlorine to add both ammonia and chlorine to the body of water if: i) the residual chloramine concentration in the second water sample is determined to be below the residual chloramine concentration in the first water sample; or ii) the residual chloramine concentration in the second water sample is determined to be below a second chloramine concentration percentage of the pre-determined residual chloramine concentration set-point.

Clause 2. The method of clause 1, wherein the supply of chlorine is added to the body of water in step b) when (i) the residual chloramine concentration in the first water sample is determined to be below the pre-determined residual chloramine concentration set-point, and wherein the supply of chlorine and the supply of ammonia are both added to the body of water in step d) when (i) the residual chloramine concentration in the second water sample is determined to be below the residual chloramine concentration in the first water sample.

Clause 3. The method of clause 1, wherein the supply of chlorine is added to the body of water in step b) when (i) the residual chloramine concentration in the first water sample is determined to be below the pre-determined residual chloramine concentration set-point, and wherein the supply of chlorine and the supply of ammonia are both added to the body of water in step d) when (ii) the residual chloramine concentration in the second water sample is determined to be below the second chloramine concentration percentage of the pre-determined residual chloramine concentration set-point.

Clause 4. The method of clause 1, wherein the supply of chlorine is added to the body of water in step b) when (ii) the residual chloramine concentration in the first water sample is determined to be below the first chloramine concentration percentage of the pre-determined residual chloramine concentration set-point, and wherein the supply of chlorine and the supply of ammonia are both added to the body of water in step d) when (i) the residual chloramine concentration in the second water sample is determined to be below the residual chloramine concentration in the first water sample.

Clause 5. The method of clause 1, wherein the supply of chlorine is added to the body of water in step b) when (ii) the residual chloramine concentration in the first water sample is determined to be below the first chloramine concentration percentage of the pre-determined residual chloramine concentration set-point, and wherein the supply of chlorine and the supply of ammonia are both added to the body of water in step d) when (ii) the residual chloramine concentration in the second water sample is determined to be below the second chloramine concentration percentage of the pre-determined residual chloramine concentration set-point.

Clause 6. The method of any of clauses 1-5, wherein, if the residual chloramine concentration in the second water sample is determined to be at or above the residual chloramine concentration in the first water sample but below the pre-determined residual chloramine concentration set-point, the addition of chlorine only to the body of water is maintained.

Clause 7. The method of any of clauses 1-6, wherein, if the residual chloramine concentration in the second water sample is determined to be at or above the pre-determined residual chloramine concentration set-point, the supply of chlorine to the body of water is stopped.

Clause 8. The method of any of clauses 1-7, wherein the supply of chlorine and the supply of ammonia are added to the body of water during step d) until a subsequently obtained water sample is determined to be at or above the pre-determined residual chloramine concentration set-point.

Clause 9. The method of any of clauses 1-8, wherein at least one of the first chloramine concentration percentage and the second chloramine concentration percentage is a percentage selected within a range of about 99% to about 80% of the pre-determined residual chloramine concentration set-point, provided that the first chloramine concentration percentage is higher than the second chloramine concentration percentage when both the first and second chloramine concentration percentages are utilized to control the chloramine concentration.

Clause 10. The method of any of clauses 1-9, wherein a feed rate of at least one of the chlorine and ammonia are determined by reservoir water volume and dwell time.

Clause 11. The method of any of clauses 1-10, wherein, if it is determined that the body of water has a residual chloramine concentration at or above the pre-determined residual chloramine concentration set-point after step b) or step d), the method further comprises: e) determining residual chloramine concentration in a subsequent water sample obtained from the body of water; and f) automatically engaging the supply of ammonia and the supply of chlorine to add both ammonia and chlorine to the body of water if: i) the residual chloramine concentration in the subsequent water sample is determined to be below the pre-determined residual chloramine concentration set-point; or ii) the residual chloramine concentration in the subsequent water sample is determined to be below a third chloramine concentration percentage of the pre-determined residual chloramine concentration set-point.

Clause 12. The method of any of clauses 1-11, wherein determining the residual chloramine concentration in the first and second water samples comprises measuring a total chlorine concentration in the first and second water samples.

Clause 13. The method of any of clauses 1-12, wherein the chlorine and ammonia are both automatically added to the body of water to provide a weight ratio of chlorine to ammonia of 5:1.

Clause 14. The method of any of clauses 1-13, wherein the chlorine and optionally the ammonia are added to the body of water by a chemical dosing assembly that comprises chemical treatment flow tubes and a water motive tube, and wherein the chlorine and optionally the ammonia are added to the body of water by the chemical treatment flow tubes in an area above the water motive tube to form a high energy mixing zone.

Clause 15. A treatment delivery system for automatically controlling chloramine concentration in a body of water contained in a reservoir comprising: a chemical dosing assembly at least partially submerged in the body of water; a water sampling assembly configured to extract at least a first and second water sample from the body of water at different points in time; an analyzer in fluid communication with the water sampling assembly and configured to determine residual chloramine concentration in the first and second water samples; a controller in operable communication with the analyzer; and one or more computer-readable storage mediums in operable communication with the controller and containing programming instructions that, when executed, cause the controller to: a) determine whether the residual chloramine concentration in the first water sample obtained from the body of water is below a pre-determined residual chloramine concentration set-point or below a first chloramine concentration percentage of a pre-determined residual chloramine concentration set-point; b) engage the chemical dosing assembly to add chlorine to the body of water when: i) the residual chloramine concentration in the first water sample is determined to be below the pre-determined residual chloramine concentration set-point; or ii) the residual chloramine concentration in the first water sample is determined to be below the first chloramine concentration percentage of the pre-determined residual chloramine concentration set-point; c) determine whether the residual chloramine concentration in the second water sample obtained from the body of water after step b) is below the residual chloramine concentration in the first water sample or below a second chloramine concentration percentage of the pre-determined residual chloramine concentration set-point; and d) engage a supply of chlorine and a supply of ammonia to add both ammonia and chlorine to the body of water if: i) the residual chloramine concentration in the second water sample is determined to be below the residual chloramine concentration in the first water sample; or ii) the residual chloramine concentration in the second water sample is determined to be below the second chloramine concentration percentage of the pre-determined residual chloramine concentration set-point.

Clause 16. The system of clause 15, wherein the water sampling assembly is a component of the chemical dosing assembly.

Clause 17. The system of clauses 15 or 16, wherein the analyzer comprises a total chlorine analyzer.

Clause 18. The system of any of clauses 15-17, wherein the chemical dosing assembly further comprises a water motive tube positioned below a release point of at least one chemical treatment flow tube.

Clause 19. The system of any of clauses 15-18, wherein the chemical dosing assembly further comprises a second chemical treatment flow tube and wherein the water motive tube is positioned below a release point of the second chemical treatment flow tube.

Clause 20. The system of clause 19, wherein the first and second chemical treatment flow tubes are configured to deliver the chlorine and optionally the ammonia to an area above a release point of the water motive tube to form a high energy mixing zone.

Clause 21. The system of any of clauses 15-20, further comprising a hypochlorite storage tank, an ammonia storage tank, or both a hypochlorite storage tank and an ammonia storage tank.

Clause 22. The system of any of clauses 15-21, further comprising a hypochlorite generation system.

Clause 23. The system of any of clauses 15-22, wherein the controller is programmed to provide-chlorine and ammonia at a weight ratio of chlorine to ammonia of 5:1.

DETAILED DESCRIPTION OF THE INVENTION

Figure 1:
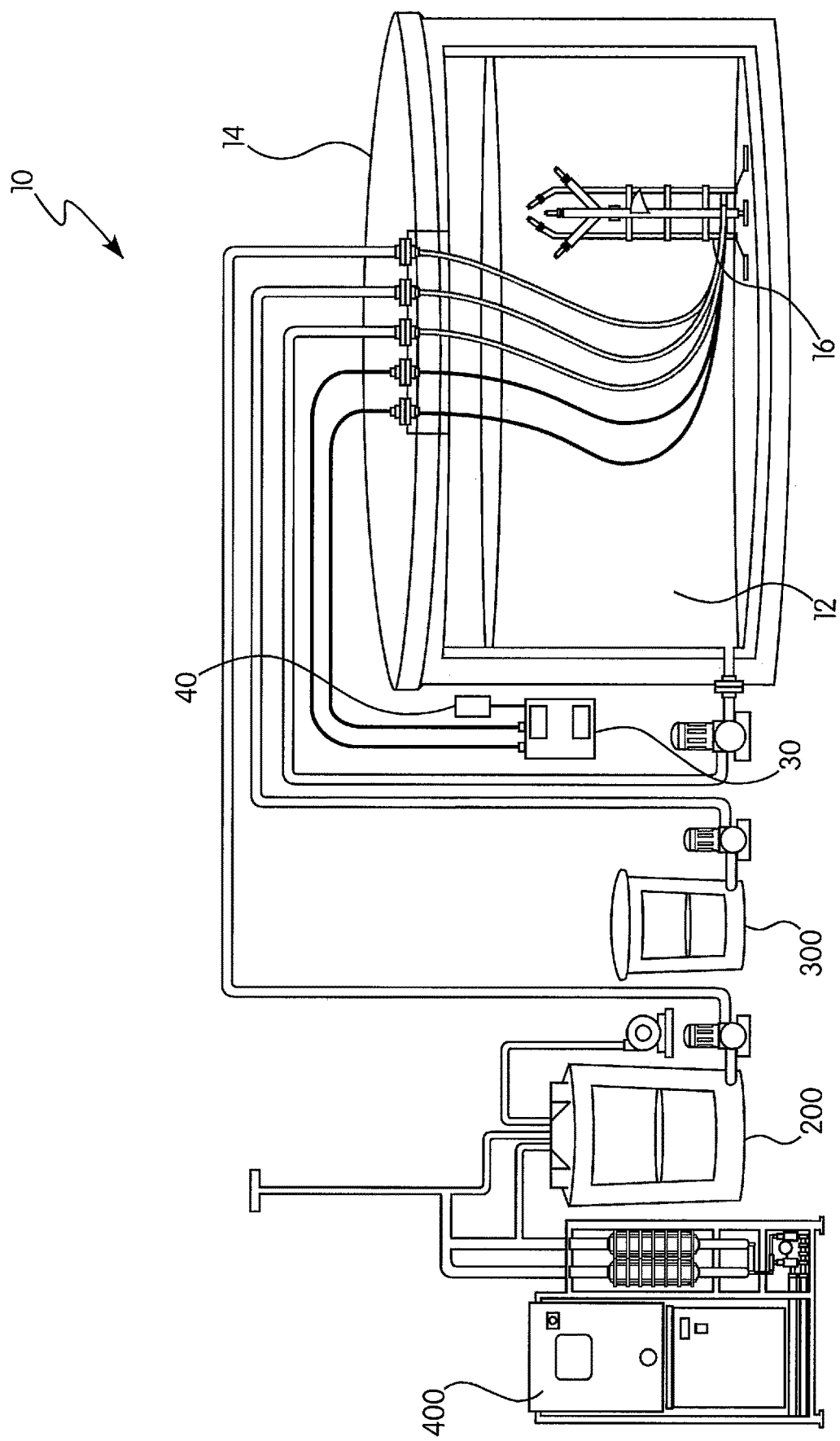
FIG. 1 illustrates a treatment delivery system according to the present invention.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Further, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Referring to FIG. 1, and in one preferred and non-limiting embodiment or aspect, the present invention is directed to a treatment delivery system 10 that can be used to automatically control chloramine concentration in a body of water 12 contained in a reservoir 14. The term "automatic control" refers to the absence of participation of a human operator in normal operations and manually controlling the controllable components. As such, the treatment delivery system 10 can be controlled without an operator monitoring or adjusting the various parameters of the treatment delivery system 10.

Figure 2:
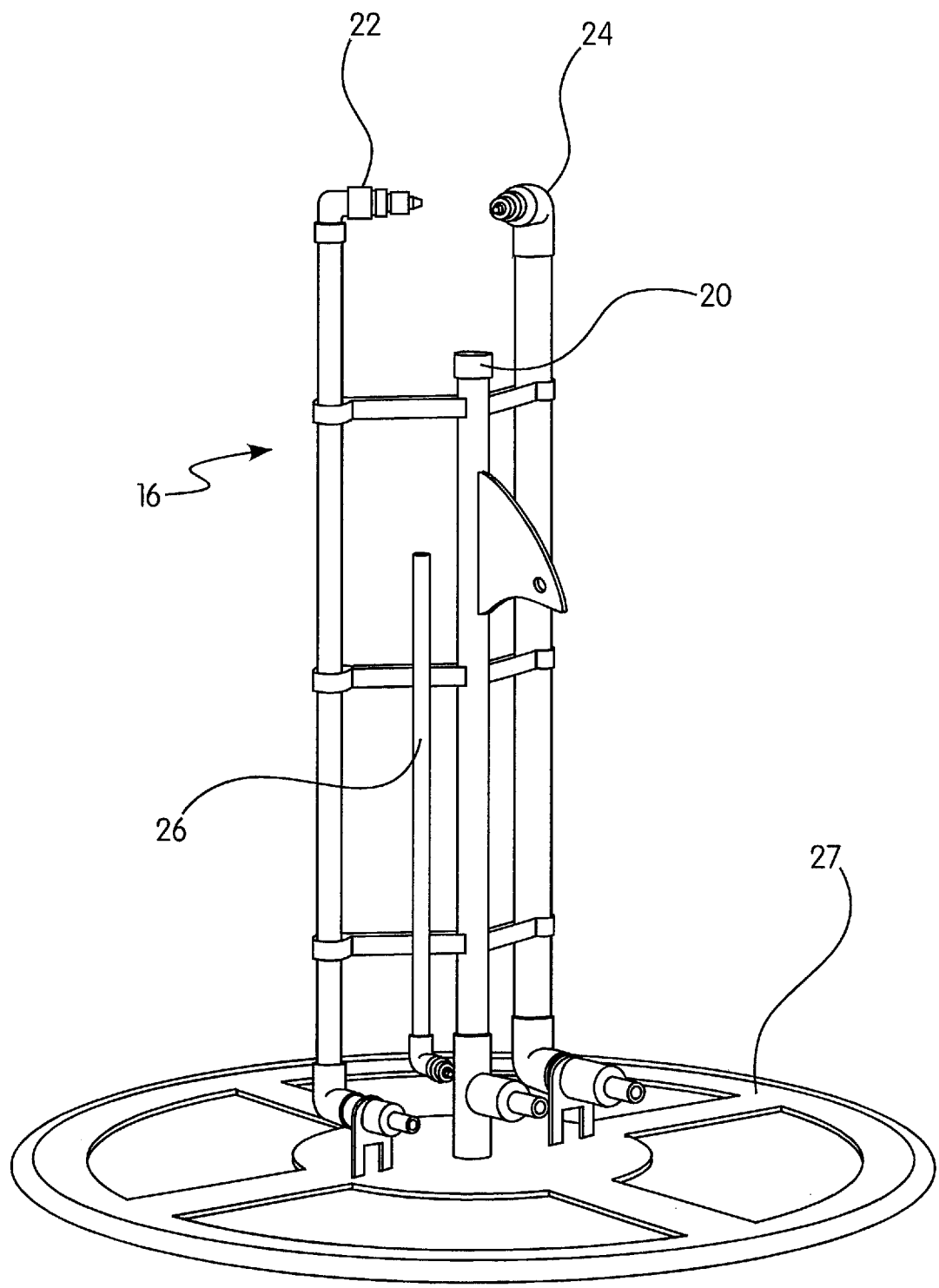
FIG. 2 illustrates a chemical dosing assembly according to the present invention.

As shown in FIG. 1, the treatment delivery system 10 can include a chemical dosing assembly 16 that can be at least partially submerged in the body of water 12. Referring to FIG. 2, and in one preferred and non-limiting embodiment or aspect, the chemical dosing assembly 16 can include a water motive tube 20, a first chemical treatment flow tube 22, and, optionally, a second chemical treatment flow tube 24. The water motive tube 20 and chemical treatment flow tubes 22, 24 of the chemical dosing assembly 16 can be oriented to expel water and chemicals, respectively, into the body of water 12 held in the reservoir 14. The chemicals used with the chemical treatment tubes 22, 24 can be selected to form chloramine, such as monochloramine, when expelled into a jet of water expelled from the water motive tube 20. For example, the first chemical treatment flow tube 22 can be in fluid communication with a source of chlorine and can be configured to expel chlorine into the body of water 12 while the second chemical treatment flow tube 24 can be in fluid communication with a source of ammonia and can be configured to expel ammonia into the body of water 12. Because of the configuration of the nozzle ends of the first and second chemical treatment flow tubes 22, 24, the chemicals expelled through the ends thereof come into almost immediate contact with one another and can begin reacting soon after being expelled into the body of water 12.

In addition, and in one preferred and non-limiting embodiment or aspect, the water motive tube 20 is positioned below the release point of the first and second chemical treatment flow tubes 22, 24 to circulate the chemicals into the body of water 12. The flow of water out of the water motive tube 20 can also create a high energy, high velocity mixing zone directly above the water motive tube 20 where the chemicals can be released, which helps the chemicals interact and form a particular compound, such as monochloramine. The treatment delivery system 10 can include multiple chemical dosing assemblies 16 strategically located throughout the reservoir 14.

The treatment delivery system 10 can further include a water sampling assembly 26 that is configured to obtain or extract water samples from the body of water 12 at different points in time, such as continuously, periodically and/or according to a pre-programmed cycle. As shown in FIG. 2, the water sampling line 26 can be a component of the chemical dosing assembly 16. For example, the water motive tube 20, chemical treatment tubes 22, 24, and water sampling assembly 26 of the chemical dosing assembly 16 can be secured to a frame 27 that is adapted to rest at the bottom of the reservoir 14. Alternatively, the water motive tube 20, the chemical treatment tubes 22, 24, and the water sampling assembly 26 can extend into the reservoir 14 to a desired depth. Yet another alternative (not shown) is that the water sampling assembly 26 can be separate from the chemical dosing assembly 26 and may be located at any location within the reservoir 14. Treatment delivery system 10 may also include multiple water sampling assemblies 26 positioned throughout the reservoir 14.

Referring to FIG. 1, and in one preferred and non-limiting embodiment or aspect, the treatment delivery system 10 can also include an analyzer 30 that is in fluid communication with the water sampling assembly 26. The analyzer 30 is configured to receive the water samples and analyze the contents thereof. In one preferred and non-limiting embodiment or aspect, the analyzer 30 is programmed or configured to determine the concentration of chloramine in the water sample. Various methods are known to determine the chloramine concentration in a sample of water. In one preferred and non-limiting embodiment or aspect, the analyzer 30 is, or includes, a chloramine analyzer, such as the APA 6000 Ammonia and Monochloramine Analyzer commercially available from Hach Company of Loveland, Colo., which can directly measure the chloramine concentration in the water sample. In another preferred and non-limiting embodiment or aspect, the analyzer 30 is, or includes, a total chlorine analyzer, such as the total chlorine analyzer commercially available from ProMinent Fluid Controls, Inc. of Pittsburgh, Pa., which can be used to indirectly measure the chloramine concentration. In this latter embodiment, the analyzer 30 measures the total chlorine residual in a water sample and, from this measurement, the residual chloramine concentration is determined either by the analyzer 30 or by a controller 40 or other processor associated therewith. It will be appreciated that the analyzer 30 may be a standalone device or, in other embodiments, may be software and/or firmware executed by the controller 40 or other processor.

As indicated, the treatment delivery system 10 can further include a controller 40 that is in operable communication with the analyzer 30 so that measurements and other data gathered, and/or determined by the analyzer 30, can be transferred or accessed by the controller 40. One or more computer-readable storage mediums can be in operable communication with the controller 40. The computer-readable storage mediums can contain programming instructions that, when executed, cause the controller 40 to perform multiple tasks. This includes programming algorithms such as those described herein that allow the controller 40 to control the administration of chlorine and/or ammonia into the body of water 12 for establishing, reestablishing, and maintaining target residual chloramine levels within the body of water 12. The programming instructions can be updated and modified. For example, the target residual chloramine level can be changed as can the flow rates of the chlorine and/or ammonia and the water sampling frequency.

In one example, and in one preferred and non-limiting embodiment or aspect, the programming instructions, when executed, can cause the controller 40 to: measure and/or analyze a first water sample obtained from the body of water 12, and/or determine whether the residual chloramine concentration in the first water sample is below a pre-determined residual chloramine concentration set-point or below a first chloramine concentration percentage of a pre-determined residual chloramine concentration set-point; engage (or control) the chemical dosing assembly 16 to add chlorine to the body of water 12 if the residual chloramine concentration in the first water sample is determined to be below the residual chloramine concentration set-point or below the first chloramine concentration percentage of the residual chloramine concentration set-point; measure and/or analyze a second water sample obtained from the body of water 12 after chlorine is added, and/or determine whether the residual chloramine concentration in the second water sample is below the residual chloramine concentration in the first water sample or below a second chloramine concentration percentage of the pre-determined residual chloramine concentration set-point; and engage (or control) the chemical dosing assembly 16 to add ammonia and chlorine to the body of water 12 if the residual chloramine concentration in the second water sample is determined to be below the residual chloramine concentration in the first water sample or below the second chloramine concentration percentage of the residual chloramine concentration set-point. It will be appreciated that controller 40 may include one or more microprocessors, CPUs, and/or other computing devices.

As further shown in FIG. 1, and in one preferred and non-limiting embodiment or aspect, treatment delivery system 10 can include multiple chemical storage tanks, such as a first chemical storage tank 200 and a second chemical storage tank 300, which are configured to transport chemicals to the chemical dosing assembly 16 via one or more metering pumps. As indicated, the treatment delivery system 10 can deliver a source of chlorine and a source of ammonia into the body of water 12. As such, the chemical storage tanks 200, 300 can store a source of chlorine and a source of ammonia. Because the treatment delivery system 10 is capable of delivering any type of chlorine and ammonia source, the chemical storage tanks 200, 300 can be selected to store various sources of chlorine and ammonia. Non-limiting examples of chlorine sources that can be used with the present invention include pressurized chlorine gas and hypochlorites such as sodium hypochlorite, potassium hypochlorite, and calcium hypochlorite. Non-limiting examples of ammonia sources that can be used with the present invention include pressurized anhydrous ammonia, aqueous ammonia, and liquid ammonium sulfate. The chemical storage tanks 200, 300 can also be supplied by on-site chemical generation systems, such as an on-site hypochlorite generation system 400 as shown in FIG. 1 for example that can generate hypochlorite based chemicals (e.g., sodium hypochlorite or potassium hypochlorite) directly at the water treatment site.

Non-limiting examples of chemical dosing assemblies, chemical generation systems, and the like are disclosed in U.S. Pat. No. 9,039,902, which is incorporated by reference herein in its entirety. In particular, U.S. Pat. No. 9,039,902 describes chemical dosing assemblies as well as a hypochlorite generation system that can be used as the source of chlorine that is present in first chemical storage tank 200 and, ultimately, supplied to the body of water 12.

As indicated, the treatment delivery system 10, previously described, can be used for automatically controlling chloramine concentration in a body of water 12 contained in a reservoir 14. As such, the present invention is also directed to a method of automatically controlling chloramine concentration in a body of water 12 contained in a reservoir 14. The method can be implemented through one or more algorithms and controls contained in programming instructions that, when executed, cause the system 10 to take certain actions, as described below.

The method can first include measuring, analyzing, and/or determining the residual chloramine concentration in a first water sample obtained from the body of water 12. The water sample can be obtained with the water sampling assembly 26 and transported to the analyzer 30 that is in fluid communication with the water sampling assembly 26. The analyzer 30 can then measure, analyze, and/or determine the residual chloramine concentration. The determination of the residual chloramine concentration can include measuring the residual total chlorine concentration in the first water sample.

The residual chloramine concentration determination can be reported to a controller 40 that is in operable communication with one or more computer-readable storage mediums. The controller 40 also has knowledge of, or access to, information about the set-point (target) residual chloramine concentration. If the residual chloramine concentration in the first water sample is determined to be below the residual chloramine concentration set-point (which can be based on a residual total chlorine concentration set-point, for example), then the programming instructions of the computer-readable storage mediums will cause the controller 40 to automatically engage (or control) a supply of chlorine to add chlorine to the body of water 12. The chlorine can be distributed into the body of water 12 through treatment tube 22 and/or 24 of the chemical dosing assembly 16.

In some preferred and non-limiting embodiments or aspects, the previously described method step of adding chlorine into the body of water 12 is controlled by the following algorithm I: $y<x$=add chlorine, where "y" is the residual chloramine concentration determined in the first water sample and "x" is the residual chloramine concentration set-point. Thus, the programming instructions can include algorithm I that, when satisfied, will cause the controller 40 to automatically engage (or control) a supply of chlorine to add chlorine to the body of water 12.

After adding chlorine, additional samples of water can be obtained from the body of water 12 with the water sampling assembly 26. The analyzer 30 can again measure, analyze, and/or determine the residual chloramine concentration in one or more (but at least one) subsequent water samples. The residual chloramine concentration determination in the subsequent sample(s) can be sent to the controller 40 in operable communication with the computer-readable storage mediums. If, after the passage of a length of time, such as several hours, the residual chloramine concentration in a second water sample is determined to be below the residual chloramine concentration in the first water sample, the programming instructions will cause the controller 40 to automatically engage (or control) a supply of chlorine and ammonia to add both ammonia and chlorine to the body of water 12. The chlorine and ammonia can be added to the body of water 12 through treatment tubes 22 and 24 of the chemical dosing assembly 16.

In some preferred and non-limiting embodiments or aspects, the previously described method step of adding both chlorine and ammonia into the body of water 12 is controlled by the following algorithm II: $w<y$=add both chlorine and ammonia, where "w" is the residual chloramine concentration determined in the second water sample and "y" is the residual chloramine concentration determined in the first water sample. Thus, the programming instructions can include algorithm II that, when satisfied, will cause the controller 40 to automatically engage (or control) a supply of chlorine and a supply of ammonia to add both chlorine and ammonia to the body of water 12.

Chlorine and ammonia are added to the body of water 12 until a subsequently-obtained water sample is determined to be at or above the residual chloramine concentration set-point, at which point the programming instructions will cause the controller 40 to stop the supply of chlorine and the supply of ammonia into the body of water 12.

In some preferred and non-limiting embodiments or aspects, the previously described method step of stopping the addition of chlorine and ammonia into the body of water 12 is controlled by the following algorithm III: $z \geq x$=stop the supply of chlorine and ammonia, where "z" is the residual chloramine concentration determined in a subsequent water sample as chlorine and ammonia are being supplied to the body of water 12, and "x" is the residual chloramine concentration set-point. Thus, the programming instructions can include algorithm III that, when satisfied, will cause the controller 40 to stop automatically engaging (or controlling) a supply of chlorine and a supply of ammonia, and therefore stop adding chlorine and ammonia to the body of water 12.

Alternatively, if the residual chloramine concentration in the second water sample is determined to be at or above the residual chloramine concentration in the first water sample, but below the residual chloramine concentration set-point, the programming instructions will cause the controller 40 to continue to automatically engage (or control) a supply of chlorine to add chlorine only to the body of water 12.

In some preferred and non-limiting embodiments or aspects, the method step of continually adding chlorine is controlled by the following algorithm IV: $w \geq y$ and $w<x$=add chlorine, where "w" is the residual chloramine concentration determined in the second water sample, "y" is the residual chloramine concentration determined in the first water sample, and "x" is the residual chloramine concentration set-point. Thus, the programming instructions can include algorithm IV that, when satisfied, will cause the controller 40 to continue to automatically engage (or control) a supply of chlorine to add chlorine to the body of water 12.

Further, if the residual chloramine concentration in the second water sample is determined to be at or above the residual chloramine concentration set-point, the programming instructions will cause the controller 40 to stop the supply of chlorine into the body of water 12.

In some preferred and non-limiting embodiments or aspects, the method step of stopping the supply of chlorine is controlled by the following algorithm V: $w \geq x =$ stop the supply of chlorine, where "w" is the residual chloramine concentration determined in the second water sample, and "x" is the residual chloramine concentration set-point. Thus, the programming instructions can include algorithm V that, when satisfied, will cause the controller 40 to stop automatically engaging (or controlling) a supply of chlorine and therefore stop adding chlorine to the body of water 12.

In some preferred and non-limiting embodiments or aspects, the controller 40 is programed to stop the supply of chlorine or the supply of chlorine and ammonia into the body of water 12 when the residual chloramine concentration is above a particular percentage of the residual chloramine concentration set-point. For example, the controller 40 can be programmed to stop the supply of chlorine or the supply of chlorine and ammonia into the body of water 12 when the residual chloramine concentration in a water sample is a percentage selected within a range of 101% to 110% of the residual chloramine concentration set-point, or a percentage selected within a range of 101% to 105% of the residual chloramine concentration set-point.

In such preferred and non-limiting embodiments or aspects, different programming algorithms are used to control when the supply of chlorine and/or the supply of chlorine and ammonia into the body of water 12 is stopped. For instance, the method step of stopping the supply of chlorine can be controlled by the following algorithm VI: $w > [(t)(x)] =$ stop the supply of chlorine, where "w" is the residual chloramine concentration determined in the second water sample, "t" is a percentage selected within a range of 101% to 110%, and "x" is the residual chloramine concentration set-point.

In addition, the method step of stopping the addition of chlorine and ammonia into the body of water 12 can be controlled by the following algorithm VII: $z > [(t)(x)] =$ stop the supply of chlorine and ammonia, where "z" is the residual chloramine concentration determined in a subsequent water sample as chlorine and ammonia are being supplied to the body of water 12, "t" is a percentage selected within a range of 101% to 110%, and "x" is the residual chloramine concentration set-point. Thus, the programming instructions can include, or can be modified to include, algorithms VI and/or VII that, when satisfied, will cause the controller 40 to stop automatically engaging (or controlling) a supply of chlorine and/or a supply of chlorine and a supply of ammonia.

Figure 3:
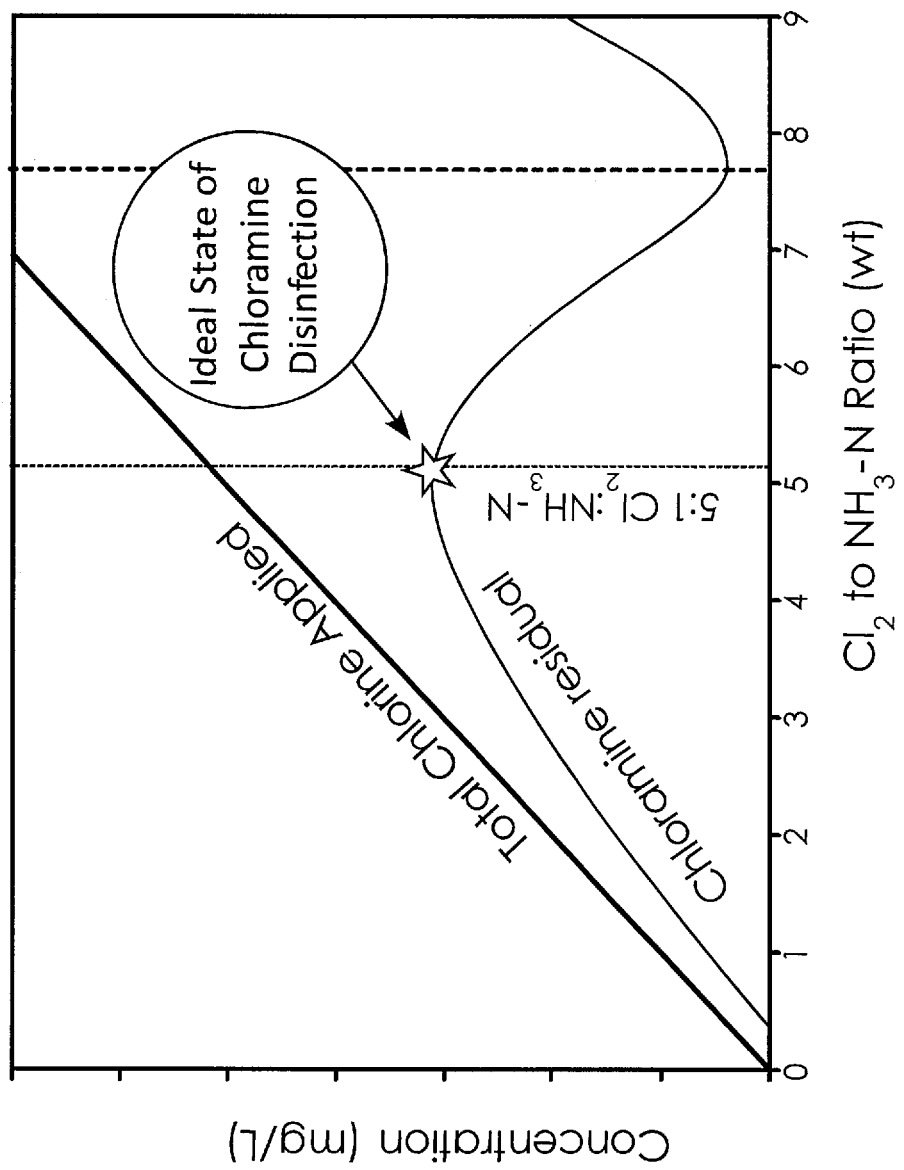
FIG. 3 is a chloramine breakpoint curve.

It is appreciated that the previously-described method works in accordance with the chloramine breakpoint curve, shown in FIG. 3. In particular, the previously-described steps are used to achieve and maintain an ideal state of monochloramine disinfectant by predicting where the chloramine concentration in the body of water 12 resides along the breakpoint curve and adjusting the input of chlorine or chlorine and ammonia into the body of water 12 to achieve and maintain a position at or near the ideal state. As shown in FIG. 3, the ideal state (i.e., the maximum monochloramine concentration obtainable in a body of water 12) is typically achieved at a weight ratio of chlorine ($Cl_2$) to ammonia-nitrogen ($NH_3$—N) of 5:1.

Figure 4:
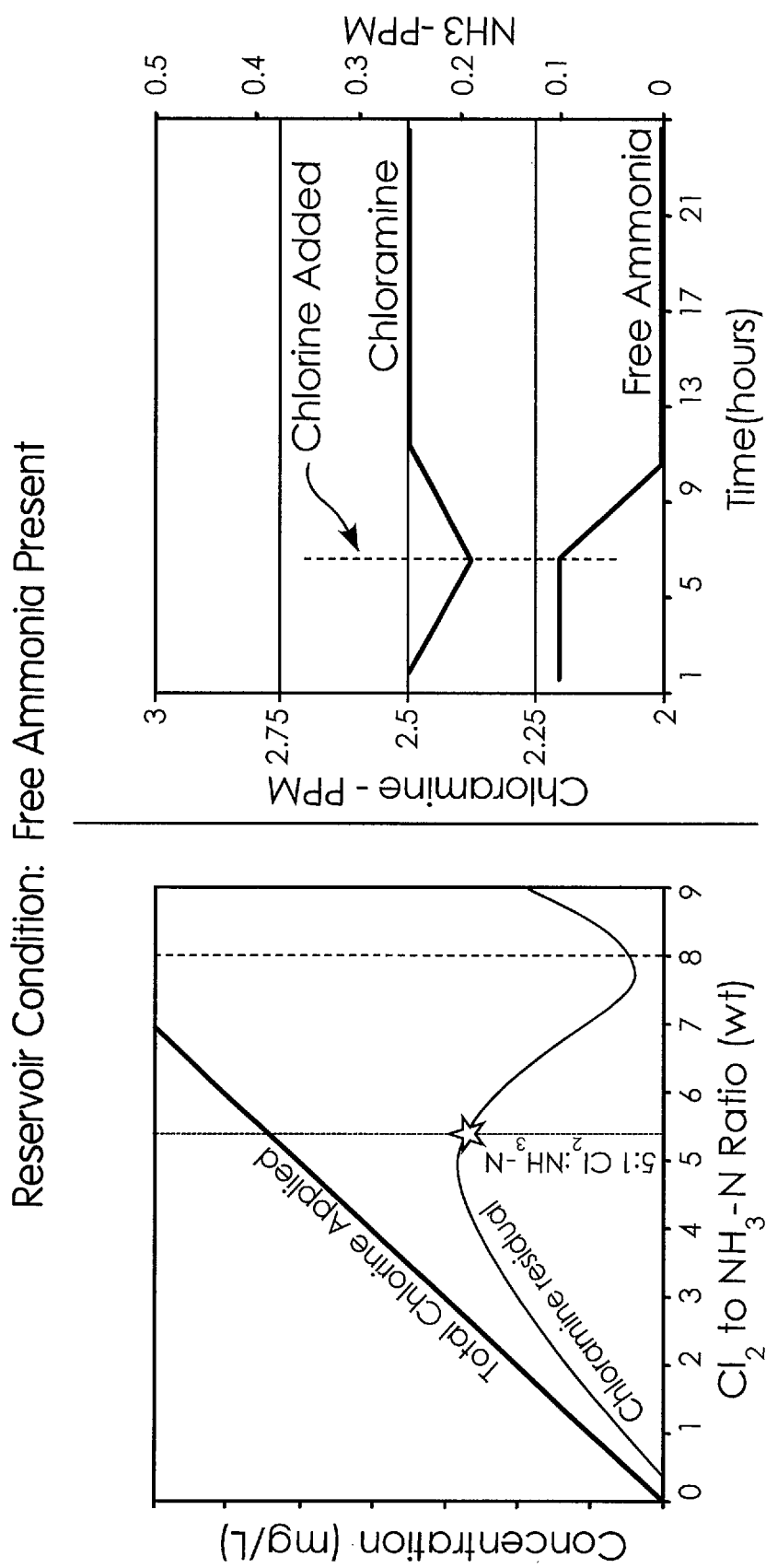
FIG. 4 are graphs illustrating the addition of chlorine in the presence of free ammonia to generate chloramine.
Figure 5:
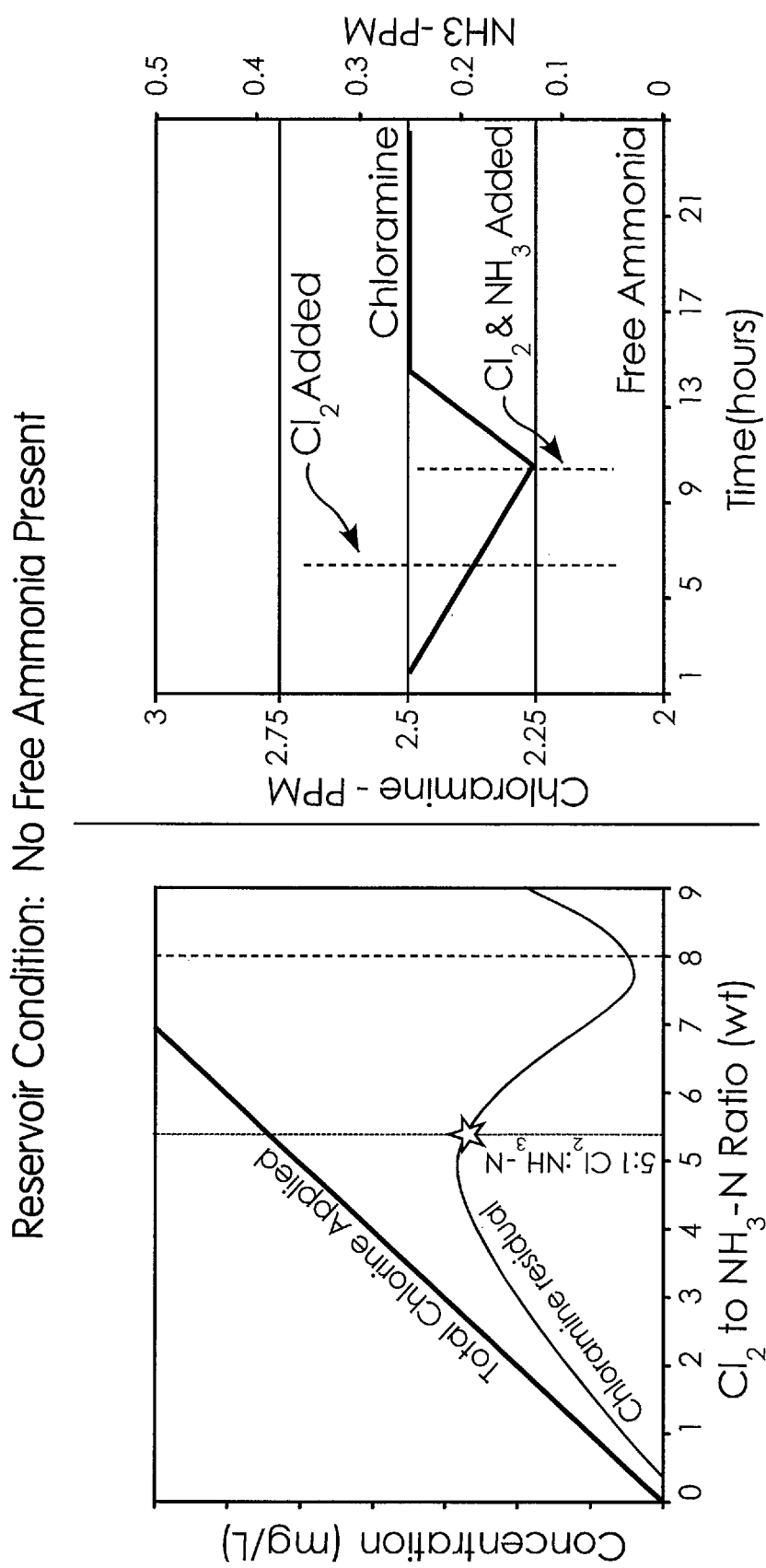
FIG. 5 are graphs illustrating the addition of chlorine and ammonia in the absence of free ammonia to generate chloramine.

Referring to FIGS. 4 and 5, and in one preferred and non-limiting embodiment or aspect, the method includes at least two modes, or stages, in view of the chloramine breakpoint curve. In the first mode shown in FIG. 4, it is assumed that free ammonia is present in the body of water 12. During the first mode, water samples are periodically drawn from the body of water 12 and analyzed to determine the chloramine concentration. In one preferred and non-limiting embodiment or aspect, this determination is accomplished by measuring the total chlorine present in the sample using a total chlorine analyzer, such as the total chlorine analyzer commercially available from ProMinent Fluid Controls, Inc. of Pittsburgh, Pa. If the system 10 determines that the total chlorine levels measured are in decline, the controller 40 is configured to engage (or control) a chlorine line 22 or 24 to add chlorine to the body of water 12. Because free ammonia is assumed to be present, newly-added chlorine will react with the free ammonia to generate chloramine, thus increasing the concentration of chloramine in the body of water 12 and reducing the concentration of free ammonia, as reflected in FIG. 4. Once the residual chloramine concentration set-point is reestablished, or established in the first instance, the addition of chlorine can cease.

In the second mode or stage of the control method as shown in FIG. 5, no free ammonia is present in the body of water 12. Because no free ammonia is present, the addition of chlorine in response to a recognized drop in the chloramine concentration will result not in an upswing (or increase) in the chloramine concentration, as in the first mode described above, but rather in a further reduction in the chloramine concentration. This is caused by the absence of free ammonia in the body of water 12, which precludes the formation of chloramine through a reaction between the added chlorine and free ammonia. If, after the addition of chlorine in the first mode, the chloramine concentration does not increase after a sufficient amount of time, such as after 4 to 5 hours, the system 10 can conclude that free ammonia is absent from the body of water 12. In response, the controller 40 is configured to engage (or control) a source of chlorine and a source of ammonia to inject into the body of water 12, as reflected in FIG. 5. The ammonia and chlorine can continue being added until analysis of water samples extracted from the body of water 12 determines that the residual chloramine concentration set-point has been reestablished (or established).

It is appreciated that the second mode is initiated by the ability of the system 10 to predict the location of the chloramine reaction on the break point curve. For instance, if the measured total chlorine residual concentration continues to decrease as chlorine is added, the system 10 can conclude that no free ammonia is present and that the residual chloramine concentration is decreasing past the ideal state shown in FIG. 5. As a result, the second mode is initiated and the controller 40 will add chlorine and ammonia into the body of water 12.

In certain preferred and non-limiting embodiments or aspects, the method uses a chloramine concentration percentage to determine when to engage (or control) and add a supply of chlorine, and/or when to engage (or control) and add a supply of chlorine and ammonia to the body of water 12. For instance, the programming instructions can cause the controller 40 to engage (or control) a supply of chlorine and add the chlorine to the body of water 12 when it is determined that the residual chloramine concentration in a water sample is below a percentage selected within a range of 99% to 80% of the residual chloramine concentration set-point, or below a percentage selected within a range of 99% to 85% of the residual chloramine concentration set-point, or below a percentage selected within a range of 99% to 90% of the residual chloramine concentration set-point, or below a percentage selected within a range of 99% to 95% of the residual chloramine concentration set-point.

In some preferred and non-limiting embodiments or aspects, the previously described method step of adding chlorine into the body of water 12 based on a chloramine concentration percentage is controlled by the following algorithm VIII: $y<[(a)(x)]$=add chlorine, where "y" is the residual chloramine concentration determined in the first water sample, "a" is a percentage selected within a range of 99% to 80%, and "x" is the residual chloramine concentration set-point. Thus, the programming instructions can include, or can be modified to include, algorithm VIII that, when satisfied, will cause the controller 40 to automatically engage (or control) a supply of chlorine to add chlorine to the body of water 12.

In one preferred and non-limiting embodiment or aspect, the residual chloramine concentration set-point is 2.5 mg/L and the controller 40 is programmed to engage (or control) a supply of chlorine and add the chlorine to the body of water 12 when it is determined that the residual chloramine concentration in a water sample is below 95% of the residual chloramine concentration set-point. As a result, the controller 40 will engage (or control) a supply of chlorine and add the chlorine to the body of water 12 only when the residual chloramine concentration in a water sample is below a residual chloramine concentration of 2.375 mg/L. Thus, the method can be programmed to add chlorine to the body of water 12 when it is determined that the residual chloramine concentration is below a selected percentage of the residual chloramine concentration set-point.

As chlorine is supplied to the body of water 12 in response to a first water sample being below a certain percentage of the residual chloramine concentration set-point, a second water sample is obtained and analyzed to determine the new residual chloramine concentration. If the residual chloramine concentration in the second water sample is determined to be below the residual chloramine concentration in the first water sample, the programming instructions will cause the controller 40 to automatically engage (or control) a supply of chlorine and ammonia to add both ammonia and chlorine to the body of water 12. For example, in some preferred and non-limiting embodiments or aspects, the programming instructions also utilize algorithm II that, when satisfied, causes the controller 40 to automatically engage (or control) a supply of chlorine and a supply of ammonia to add both chlorine and ammonia to the body of water 12.

As previously described, chlorine and ammonia are added to the body of water 12 until a subsequently obtained water sample is determined to be at or above the residual chloramine concentration set-point or above a particular percentage of the residual chloramine concentration set-point, at which point the programming instructions will cause the controller 40 to stop the supply of chlorine and ammonia into the body of water 12. The method step of stopping the addition of chlorine and ammonia into the body of water 12 can be controlled, for example, with programming algorithm III or with programming algorithm VII.

Alternatively, if the residual chloramine concentration in the second water sample is determined to be at or above the residual chloramine concentration in the first water sample but below the residual chloramine concentration set-point, the programming instructions will cause the controller 40 to continue to automatically engage (or control) a supply of chlorine to add chlorine only to the body of water 12. The method step of continually adding chlorine after further analysis can be controlled, for example, with programming algorithm IV.

Further, if the residual chloramine concentration in the second water sample is determined to be at or above the residual chloramine concentration set-point or above a particular percentage of the residual chloramine concentration set-point, the programming instructions will cause the controller 40 to stop the supply of chlorine into the body of water 12. The method step of stopping the addition of chlorine into the body of water 12 can be controlled, for example, with programming algorithm V or with programming algorithm VI.

As indicated, the method can also use a chloramine concentration percentage to determine when to engage (or control) and add a supply of both chlorine and ammonia to the body of water 12. For example, the programming instructions can cause the controller 40 to engage (or control) and add a supply of both chlorine and ammonia to the body of water 12 when: (i) chlorine only is being added after determining that the residual chloramine concentration in a first water sample is below the residual chloramine concentration set-point, such as when programming algorithm I is utilized and satisfied for example; and (ii) the residual chloramine concentration in a second or subsequent water sample is determined to be below a percentage selected within a range of 99% to 80% of the residual chloramine concentration set-point, or below a percentage selected within a range of 99% to 85% of the residual chloramine concentration set-point, or below a percentage selected within a range of 99% to 90% of the residual chloramine concentration set-point, or below a percentage selected within a range of 99% to 95% of the residual chloramine concentration set-point, or below a percentage selected within a range of 95% to 90% of the residual chloramine concentration set-point.

In some preferred and non-limiting embodiments or aspects, the previously described method step of adding both chlorine and ammonia into the body of water 12 (after initial step (i) is satisfied and chlorine only is being added) is controlled by the following algorithm IX: $w<[(b)(x)]$=add chlorine and ammonia, where "w" is the residual chloramine concentration determined in the second water sample, "b" is a percentage selected within a range of 99% to 80%, and "x" is the residual chloramine concentration set-point. Thus, the programming instructions can include, or can be modified to include, algorithm IX that, when satisfied, will cause the controller 40 to automatically engage (or control) a supply of chlorine and a supply of ammonia to add both chlorine and ammonia to the body of water 12.

Chlorine and ammonia are added to the body of water 12 until a subsequently obtained water sample is determined to be at or above the residual chloramine concentration set-point or above a particular percentage of the residual chloramine concentration set-point, at which point the programming instructions will cause the controller 40 to stop the supply of chlorine and ammonia into the body of water 12. The method step of stopping the addition of chlorine and ammonia into the body of water 12 can be controlled, for example, with programming algorithm III or with programming algorithm VII.

In one example, the residual chloramine concentration set-point is 2.5 mg/L and the controller 40 is programmed to engage and add both chlorine and ammonia to the body of water 12 when the residual chloramine concentration in a water sample is below 90% of the residual chloramine concentration set-point. As a result, the controller 40 will add both chlorine and ammonia to the body of water 12 when: (i) chlorine only is being added after determining that the residual chloramine concentration in a first water sample is below the residual chloramine concentration set-point; and (ii) the residual chloramine concentration in a second water sample is below a residual chloramine concentration of 2.25 mg/L. Chlorine and ammonia are added to the body of water 12 until a subsequently obtained water sample is determined to be at or above the residual chloramine concentration set-point or above a particular percentage of the residual chloramine concentration set-point, at which point the programming instructions will cause the controller 40 to stop the supply of chlorine and ammonia into the body of water 12.

In one preferred and non-limiting embodiment or aspect, the method can also utilize a first chloramine concentration percentage of the residual chloramine concentration set-point to determine when to engage (or control) and add a supply of chlorine only, and a second chloramine concentration percentage of the residual chloramine concentration set-point to determine when to engage (or control) and add a supply of both chlorine and ammonia. The first and second chloramine concentration percentages can comprise a percentage selected, for example, within a range of 99% to 80% of the residual chloramine concentration set-point, provided that the first chloramine concentration percentage that indicates when to supply chlorine only is higher than the second chloramine concentration percentage that indicates when to supply both chlorine and ammonia. In such embodiments, the method will utilize: (i) a residual chloramine concentration set-point (i.e. the target concentration); (ii) a first chloramine concentration percentage of the residual chloramine concentration set-point to determine whether to add a supply of chlorine only; and (iii) a second chloramine concentration percentage of the residual chloramine concentration set-point to determine when to engage and add a supply of both chlorine and ammonia.

Thus, in one preferred and non-limiting embodiment or aspect, the programming instructions will cause the controller 40 to: (a) add chlorine after determining that the residual chloramine concentration in a first water sample is below the first chloramine concentration percentage of the residual chloramine concentration set-point; and (b) add chlorine and ammonia after determining that the residual chloramine concentration in a second water sample is below the second chloramine concentration percentage of the residual chloramine concentration set-point. It is appreciated that the method will only proceed with step (b) after step (a) has already commenced and chlorine only is being added to the body of water 12. It is further appreciated that the previously described method steps can utilize both programming algorithm VIII and programming algorithm IX.

In one example, the residual chloramine concentration set-point is 2.5 mg/L and the controller 40 is programmed to engage (or control) and add only chlorine to the body of water 12 when it is determined that the residual chloramine concentration in a water sample is below 95% of the residual chloramine concentration set-point. The controller 40 is also programmed to add both chlorine and ammonia when it is determined that the residual chloramine concentration in a subsequent water sample is below 90% of the residual chloramine concentration set-point. As a result, the controller 40 will add: (i) only chlorine after determining that a first water sample is below a residual chloramine concentration of 2.375 mg/L; and (ii) then subsequently chlorine and ammonia after determining that the residual chloramine concentration in a second water sample is below a residual chloramine concentration of 2.25 mg/L. Chlorine and ammonia are added to the body of water 12 until a subsequently obtained water sample is determined to be at or above the residual chloramine concentration set-point or above a particular percentage of the residual chloramine concentration set-point, at which point the programming instructions will cause the controller 40 to stop the supply of chlorine and ammonia into the body of water 12.

As indicated, any of the previously-described method steps, or combination of steps, can be used to establish, reestablish, and maintain a desired residual chloramine level within the body of water 12. In one preferred and non-limiting embodiment or aspect, at least one of the previously-described method steps, or combination of steps, are used to establish or reestablish a desired residual chloramine concentration set-point. After the desired residual chloramine concentration set-point is established or reestablished to complete a first treatment cycle, a different algorithm can be used to reestablish the desired residual chloramine concentration in subsequent treatment cycles.

In one preferred and non-limiting embodiment or aspect, after a first treatment cycle is completed, the controller 40 is programmed to only engage (or control) a supply of chlorine and a supply of ammonia to add both chlorine and ammonia to the body of water 12 in order to reestablish the desired residual chloramine concentration set-point. Thus, in such embodiments, chlorine alone is not added to the body of water 12 in a second treatment cycle. For example, after a first treatment cycle is completed, the programming instructions of the computer-readable storage mediums can be configured to cause the controller 40 to automatically add both chlorine and ammonia to the body of water 12 when the residual chloramine concentration in a water sample is determined to be below the residual chloramine concentration set-point.

In some preferred and non-limiting embodiments or aspects, the previously described method step of adding ammonia and chlorine into the body of water 12 in a second treatment cycle is controlled by the following algorithm X: $y'<x'$=add chlorine and ammonia, where "y'" is the residual chloramine concentration determined in the first water sample of the second treatment cycle and "x'" is the residual chloramine concentration set-point. Thus, the programming instructions can include algorithm X for use in a second treatment cycle that, when satisfied, will cause the controller 40 to automatically engage (or control) a supply of chlorine and a supply of ammonia to add both chlorine and ammonia to the body of water 12.

The method can also use a chloramine concentration percentage of the residual chloramine concentration set-point to determine when to add both chlorine and ammonia to the body of water 12 in a second treatment cycle. The chloramine concentration percentage can include any of the previously-described percentages such as, for example, a percentage selected within a range of 99% to 80% of the residual chloramine concentration set-point.

In some preferred and non-limiting embodiments or aspects, the previously described method step of adding chlorine and ammonia into the body of water 12 in a second treatment cycle based on a chloramine concentration percentage is controlled by the following algorithm XI: $y'<[(a')(x')]$=add chlorine and ammonia, where "y'" is the residual chloramine concentration determined in the first water sample of the second treatment cycle, "a'" is a percentage selected within a range of 99% to 80%, and "x'" is the residual chloramine concentration set-point. Thus, the programming instructions can include algorithm XI for use in a second treatment cycle that, when satisfied, will cause the controller 40 to automatically engage (or control) a supply of chlorine and a supply of ammonia to add both chlorine and ammonia to the body of water 12.

Chlorine and ammonia are added to the body of water 12 until a subsequently obtained water sample is determined to be at or above the residual chloramine concentration set-point or above a particular percentage of the residual chloramine concentration set-point, at which point the programming instructions will cause the controller 40 to stop the supply of chlorine and ammonia into the body of water 12. The method step of stopping the addition of chlorine and ammonia into the body of water 12 can be controlled, for example, with programming algorithm III or with programming algorithm VII.

After reestablishing the target residual chloramine concentration set-point in the second treatment cycle, the programming instructions will cause the controller 40 to revert back to the original algorithm or cause the controller 40 to continue to use the modified algorithm. It is appreciated that the controller 40 can be programmed to alternate between different algorithms for any desired number of treatment cycles. For example, in a first treatment cycle, the controller 40 can be programmed to supply chlorine alone in a first step and, optionally, both chlorine and ammonia in a second step in order to establish the residual chloramine concentration set-point. Then, after a first treatment cycle is completed, the controller 40 can be programmed to supply both chlorine and ammonia only in order to reestablish the residual chloramine concentration set-point in the next three treatment cycles. Finally, to reestablish the residual chloramine concentration set-point in a fifth treatment cycle, the controller 40 can be programmed to use the original algorithm and supply chlorine alone in a first step and, optionally, both chlorine and ammonia in a second step.

The feed rate of chlorine and/or ammonia in any of the previously-described steps can be determined from the reservoir 14 water volume and dwell time. As used herein, "dwell time" refers to the rate at which water volume changes in the reservoir 14. The feed rate of the chlorine and ammonia can also be controlled by the speed at which the metering pumps distribute the chlorine and ammonia into the body of water 12. For example, the metering pumps can distribute chlorine and ammonia at a maximum speed rate. The metering pumps can also be reduced to half (i.e., 50%) of the maximum speed rate to adjust the feed rate of chlorine and ammonia.

Further, when adding both chlorine and ammonia into the body of water 12, the controller 40 typically adds each chemical at an amount that provides a particular weight ratio of chlorine to ammonia. In certain preferred and non-limiting embodiments or aspects, the chlorine and ammonia are added to the body of water 12 to provide a weight ratio of chlorine to ammonia of 5:1.

The method of automatically controlling chloramine concentration described herein allows for a desired amount of chloramine in a body of water 12 to be effectively maintained without directly measuring or initially adding free ammonia. The system and method can also be used to respond to an adjustment, such as an increase, in the target chloramine concentration.

Figure 6:
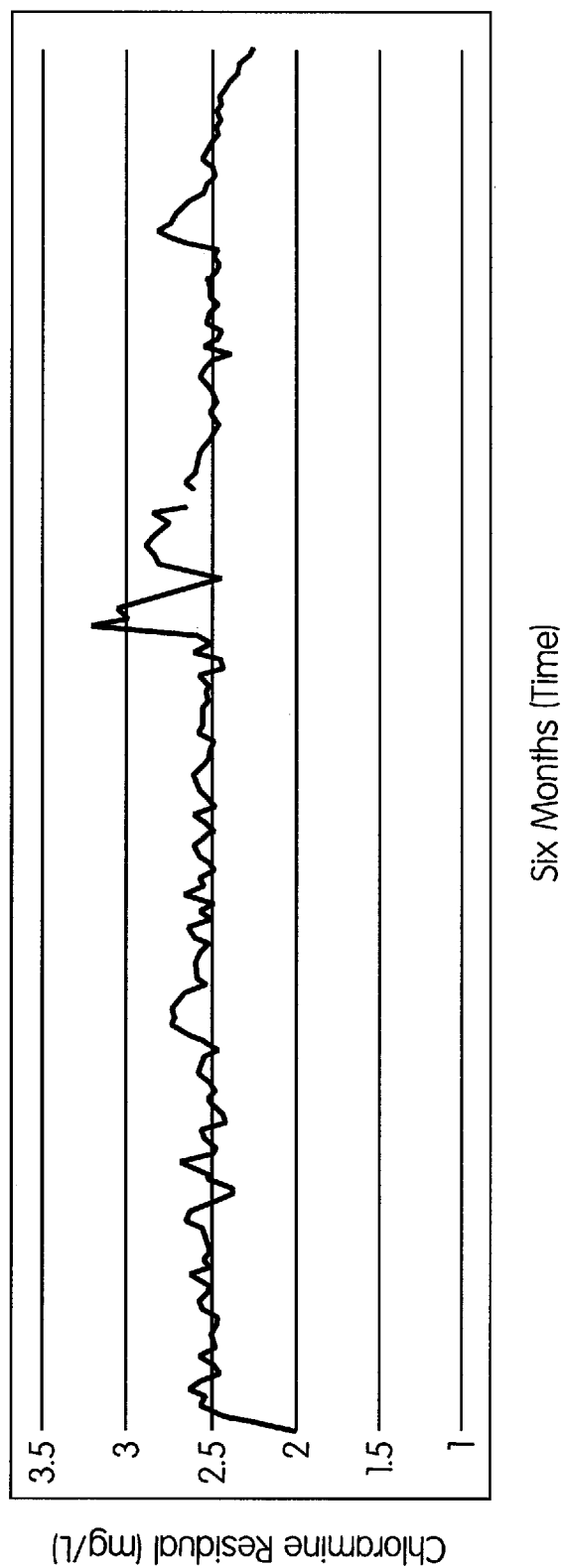
FIG. 6 is a graph of the residual chloramine concentration in a water storage reservoir over a six month period of time.

FIG. 6 shows the residual chloramine concentration in a water storage reservoir that utilized the treatment delivery system 10 and the method of automatically controlling chloramine concentration by adding a source of chlorine only and, optionally, a source of chlorine and a source of ammonia as described herein. As shown in FIG. 6, the residual chloramine concentration was consistently maintained around the residual chloramine set-point of 2.5 mg/L over a six month period of time.

Figure 7:
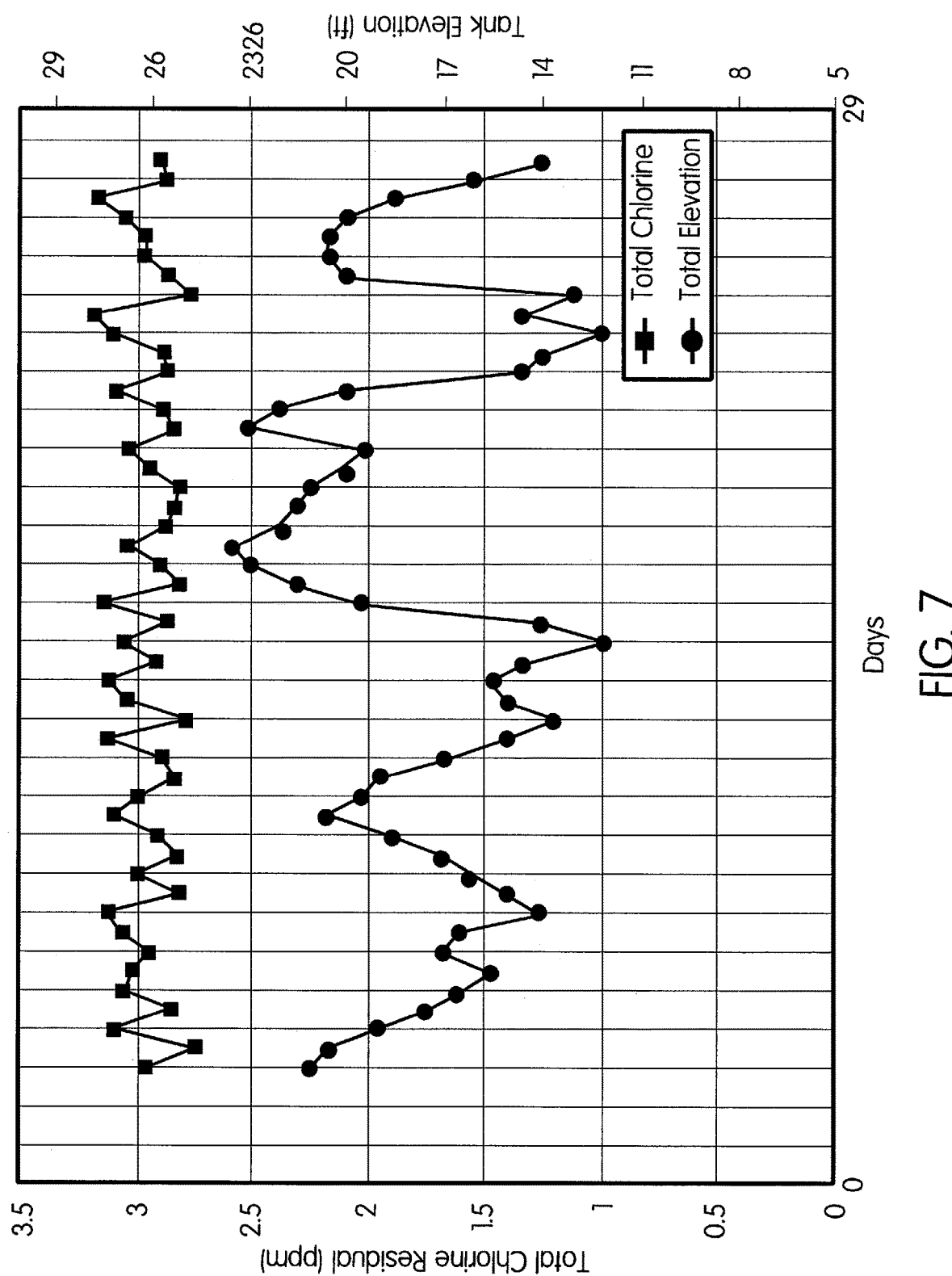
FIG. 7 is a graph of the total residual chlorine concentration in a water storage reservoir over 29 days with changing water elevations.

FIG. 7 further shows a water storage reservoir that utilized the treatment delivery system 10 and the method of automatically controlling chloramine concentration by adding a source of chlorine only and, optionally, a source of chlorine and a source of ammonia as described herein. As shown in FIG. 7, the total residual chlorine concentration was consistently maintained around a concentration of 3.0 mg/L over 29 days with changing water elevations within the reservoir 14.

Whereas particular embodiments of this invention have been described above for purposes of illustration, it will be evident to those skilled in the art that numerous variations of the details of the present invention may be made without departing from the invention as defined in the appended claims.

The invention claimed is:

1. A method of automatically controlling chloramine concentration in a body of water contained in a reservoir, the method comprising:
   a) determining residual chloramine concentration in a first water sample obtained from the body of water;
   b) automatically engaging a supply of chlorine to add chlorine to the body of water when:
      i) the residual chloramine concentration in the first water sample is determined to be below a pre-determined residual chloramine concentration set-point; or
      ii) the residual chloramine concentration in the first water sample is determined to be below a first chloramine concentration percentage of a pre-determined residual chloramine concentration set-point;
   c) determining residual chloramine concentration in a second water sample obtained from the body of water after step b); and
   d) automatically engaging a supply of ammonia and the supply of chlorine to add both ammonia and chlorine to the body of water if:
      i) the residual chloramine concentration in the second water sample is determined to be below the residual chloramine concentration in the first water sample; or
      ii) the residual chloramine concentration in the second water sample is determined to be below a second chloramine concentration percentage of the pre-determined residual chloramine concentration set-point,
   wherein a controller, in operable communication with an analyzer and one or more computer-readable storage mediums containing programming instructions, automatically executes steps a)-d),
   wherein the programming instructions comprise algorithm I for causing the controller to execute step b) i), or algorithm VIII for causing the controller to execute step b) ii):

Algorithm I: y<x=add chlorine only, where y is the residual chloramine concentration determined in the first water sample and x is the residual chloramine concentration set-point; and Algorithm VIII: y<[(a)(x)]=add chlorine only, where y is the residual chloramine concentration determined in the first water sample, a is a percentage selected within a range of 99% to 80%, and x is the residual chloramine concentration set-point;

wherein the programming instructions further comprise algorithm II for causing the controller to execute step d) i) and after chlorine only was added to the body of water, or algorithm IX for causing the controller to execute step d) ii) and after chlorine only was added to the body of water:

Algorithm II: w<y=add both chlorine and ammonia, where w is the residual chloramine concentration determined in the second water sample and y is the residual chloramine concentration determined in the first water sample; and Algorithm IX: w<[(b)(x)]=add chlorine and ammonia, where w is the residual chloramine concentration determined in the second water sample, b is a percentage selected within a range of 99% to 80%, and x is the residual chloramine concentration set-point.

2. The method of claim 1, wherein the supply of chlorine is added to the body of water in step b) when (i) the residual chloramine concentration in the first water sample is determined to be below the pre-determined residual chloramine concentration set-point and the programming instructions comprising algorithm I cause the controller to engage the supply of chlorine, and wherein the supply of chlorine and the supply of ammonia are both added to the body of water in step d) when (i) the residual chloramine concentration in the second water sample is determined to be below the residual chloramine concentration in the first water sample and the programming instructions comprising algorithm II cause the controller to engage the supply of chlorine and the supply of ammonia.

3. The method of claim 1, wherein the supply of chlorine is added to the body of water in step b) when (i) the residual chloramine concentration in the first water sample is determined to be below the pre-determined residual chloramine concentration set-point and the programming instructions comprising algorithm I cause the controller to engage the supply of chlorine, and wherein the supply of chlorine and the supply of ammonia are both added to the body of water in step d) when (ii) the residual chloramine concentration in the second water sample is determined to be below the second chloramine concentration percentage of the pre-determined residual chloramine concentration set-point and the programming instructions comprising algorithm IX cause the controller to engage the supply of chlorine and the supply of ammonia.

4. The method of claim 1, wherein the supply of chlorine is added to the body of water in step b) when (ii) the residual chloramine concentration in the first water sample is determined to be below the first chloramine concentration percentage of the pre-determined residual chloramine concentration set-point and the programming instructions comprising algorithm VIII cause the controller to engage the supply of chlorine, and wherein the supply of chlorine and the supply of ammonia are both added to the body of water in step d) when (i) the residual chloramine concentration in the second water sample is determined to be below the residual chloramine concentration in the first water sample and the programming instructions comprising algorithm II cause the controller to engage the supply of chlorine and the supply of ammonia.

5. The method of claim 1, wherein the supply of chlorine is added to the body of water in step b) when (ii) the residual chloramine concentration in the first water sample is determined to be below the first chloramine concentration percentage of the pre-determined residual chloramine concentration set-point and the programming instructions comprising algorithm VIII cause the controller to engage the supply of chlorine, and wherein the supply of chlorine and the supply of ammonia are both added to the body of water in step d) when (ii) the residual chloramine concentration in the second water sample is determined to be below the second chloramine concentration percentage of the pre-determined residual chloramine concentration set-point and the programming instructions comprising algorithm IX cause the controller to engage the supply of chlorine and the supply of ammonia.

6. The method of claim 1, wherein, if the residual chloramine concentration in the second water sample is determined to be at or above the residual chloramine concentration in the first water sample but below the pre-determined residual chloramine concentration set-point, the programming instructions cause the controller to continue to engage the supply of chlorine and the addition of chlorine only to the body of water is maintained.

7. The method of claim 1, wherein, if the residual chloramine concentration in the second water sample is determined to be at or above the pre-determined residual chloramine concentration set-point, the programming instructions cause the controller to stop engaging the supply of chlorine and the supply of chlorine to the body of water is stopped.

8. The method of claim 1, wherein the supply of chlorine and the supply of ammonia are added to the body of water during step d) until a subsequently obtained water sample is determined to be at or above the pre-determined residual chloramine concentration set-point and the programming instructions cause the controller to stop the supply of chlorine and the supply of ammonia into the body of water.

9. The method of claim 1, wherein the first chloramine concentration percentage is higher than the second chloramine concentration percentage when both the first and second chloramine concentration percentages are utilized to control the chloramine concentration.

10. The method of claim 1, wherein a feed rate of at least one of the chlorine and ammonia are determined by reservoir water volume and dwell time.

11. The method of claim 1, wherein, if it is determined that the body of water has a residual chloramine concentration at or above the pre-determined residual chloramine concentration set-point after step b), the method further comprises:

e) determining residual chloramine concentration in a subsequent water sample obtained from the body of water; and f) automatically engaging the supply of ammonia and the supply of chlorine to add both ammonia and chlorine to the body of water if:

i) the residual chloramine concentration in the subsequent water sample is determined to be below the pre-determined residual chloramine concentration set-point; or ii) the residual chloramine concentration in the subsequent water sample is determined to be below a third chloramine concentration percentage of the pre-determined residual chloramine concentration setpoint, wherein the controller, in operable communication with the analyzer and the one or more computer-readable storage mediums containing programming instructions, automatically executes steps e) and f).

12. The method of claim 1, wherein determining the residual chloramine concentration in the first and second water samples comprises measuring a total chlorine concentration in the first and second water samples.

13. The method of claim 1, wherein the chlorine and ammonia are both automatically added to the body of water to provide a weight ratio of chlorine to ammonia of 5:1.

14. The method of claim 1, wherein the chlorine and the ammonia are added to the body of water by a chemical dosing assembly that comprises chemical treatment flow tubes and a water motive tube, and wherein the chlorine and the ammonia are added to the body of water by the chemical treatment flow tubes in an area above the water motive tube to form a high energy mixing zone.

* * * * *